July 28, 1925.
B. O. GODFREY
1,547,380
PITCHOMETER
Filed Oct. 22, 1923
2 Sheets-Sheet 1
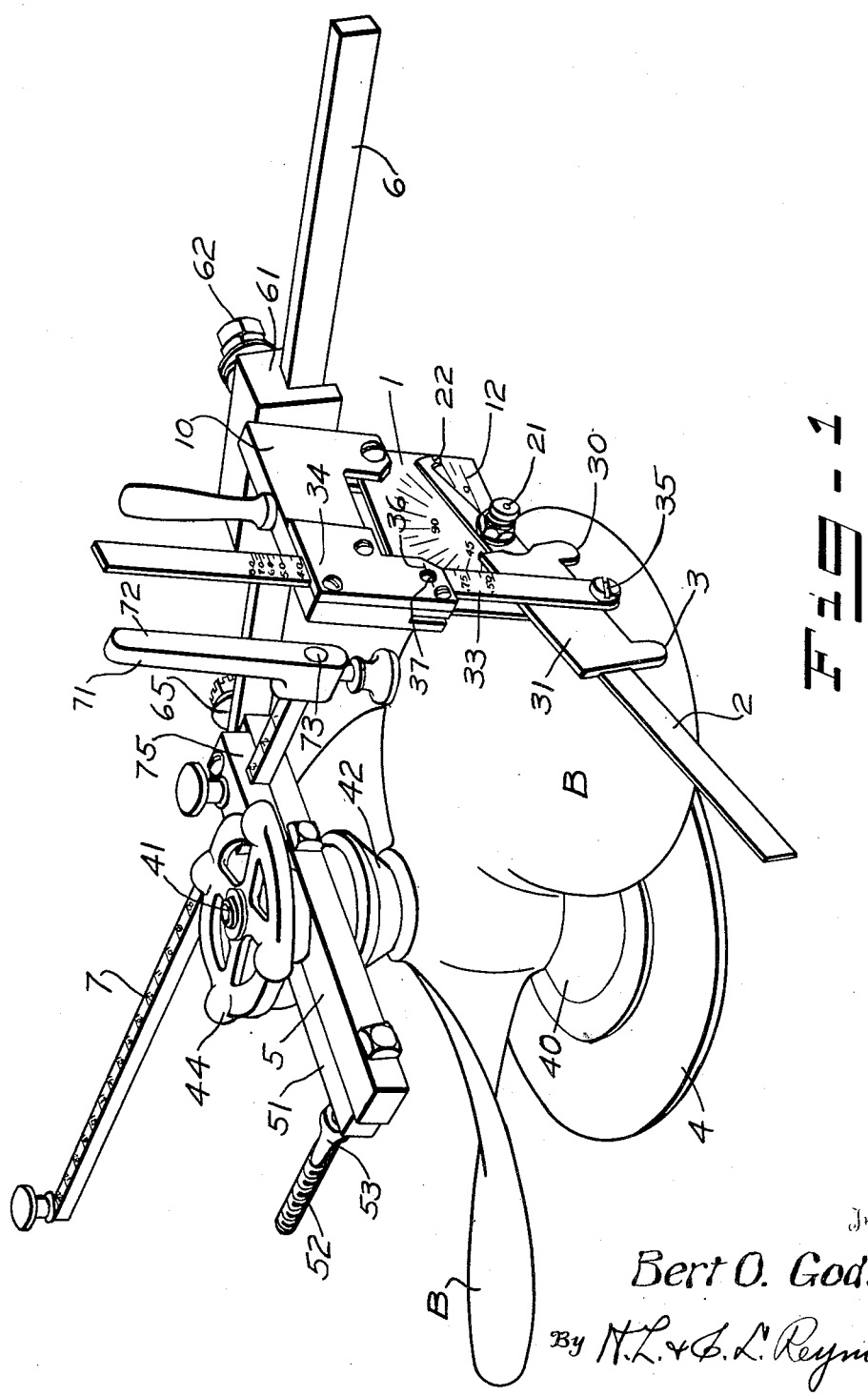
Inventor
Bert O. Godfrey
By N.L. & S.L. Reynolds
Attorneys

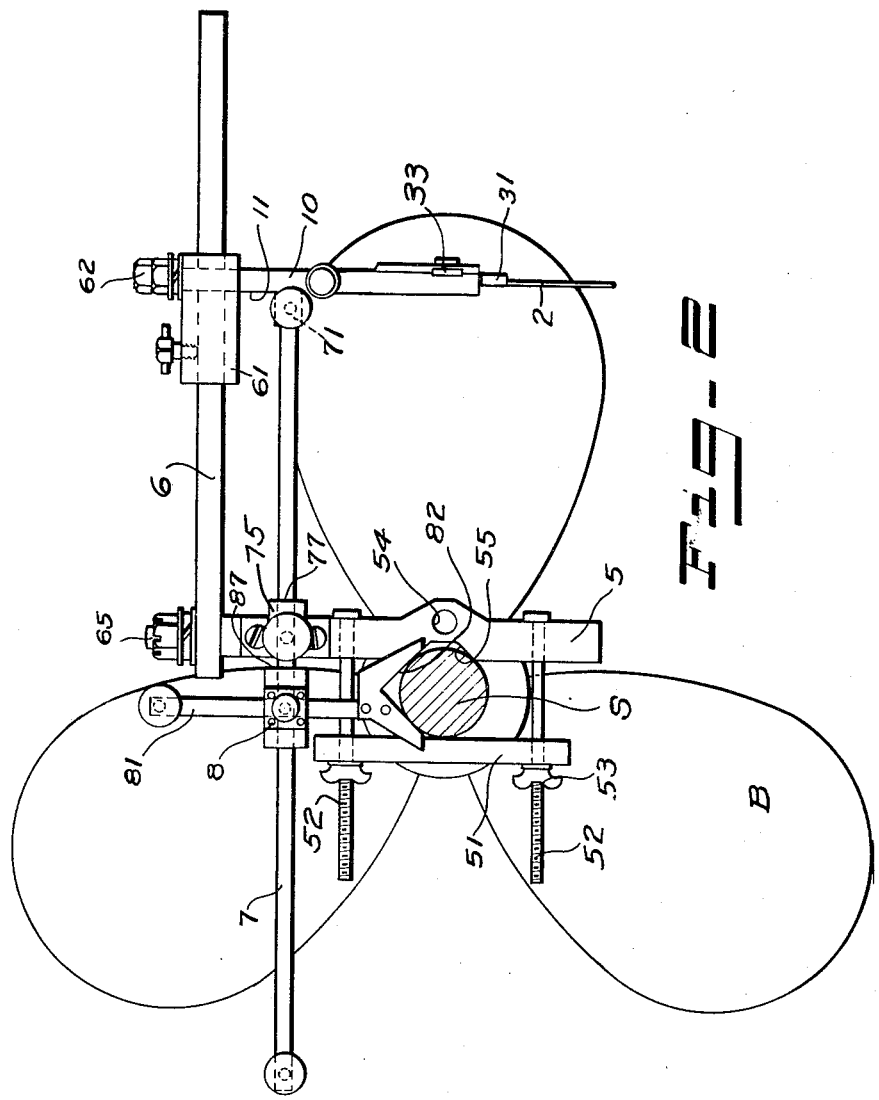

Patented July 28, 1925.

1,547,380

UNITED STATES PATENT OFFICE.

BERT O. GODFREY, OF SEATTLE, WASHINGTON.

PITCHOMETER.

Application filed October 22, 1923. Serial No. 670,005.

*To all whom it may concern:*

Be it known that I, BERT O. GODFREY, a citizen of the United States of America, and resident of the city of Seattle, in the county of King and State of Washington, have invented certain new and useful Improvements in Pitchometers, of which the following is a specification.

My invention relates to devices which are intended to determine the pitch of propeller blades, and is an improvement upon the device shown in my co-pending application Serial No. 659,544.

My present invention is particularly intended to render my former device more exact and accurate, and less liable to error, thus making it feasible to determine propeller pitch without special skill or experience in such work. In a sense then, it is my object to render the device as nearly automatic in its operation as is possible for an operation which requires some degree of skill.

A further object is to provide means whereby a pitchometer may be employed to measure the pitch of a propeller equally well whether the propeller is detached from its shaft or while it remains in place thereon.

A further object is the provision of means whereby the pair of trammel points which actually contact with the propeller blade may be made to contact with equal firmness and facility, irrespective of which is the first to come into contact with the propeller blade, and without the necessity of special manipulation to this end, by the operator.

A further object is the provision of means whereby a pitchometer may be made to contact with the propeller blade at any desired radial distance from the propeller axis, without the necessity of preliminarily measuring the distances upon the propeller itself.

A further object is the provision of a mounting for such a pitchometer which will permit ready movement thereof in all necessary directions from the propeller axis, but which will yet maintain it rigid in the direction which is necessary to give an accurate reading.

In general my object is the refinement of the pitchometer shown in my previous application and the adaptation thereof to the necessities of a relatively unskilled operator.

My invention comprises those novel parts and combinations thereof which are shown in the accompanying drawings, described in the specification, and particularly defined by the claims terminating the same.

In the accompanying drawings I have shown my invention in the form which is now preferred by me.

Figure 1 is a perspective view of my pitchometer, shown while measuring a propeller detached from its shaft.

Figure 2 is a plan view of my device while measuring a propeller which is attached to its shaft.

The pitchometer proper consists essentially of a protractor plate 1 having the usual angular scale thereon, an index arm 2 pivoted at 21 at the center of the angular scale upon the protractor, and a pair of trammel points 3 and 30 which cooperate with the protractor and index arm and which by contact with the blade of the propeller determine the relative angular position of the arm 2 and the protractor 1. It will be understood that the index arm 2 has an index 22 cooperating with the angular scale upon the protractor 1, thus indicating the angle of the arm 2 relative to the base line 12 of the protractor.

The pitchometer proper may take various other forms, as my previous application indicates, but as I now prefer to make it the trammel points 3 and 30 are formed upon a slide 31 which is slidable lengthwise of the arm 2. I provide means whereby the trammel points merely by contact with the blade B of the propeller will determine the angular position of the arm 2, assuming the protractor 1 to be held. This may be done conveniently by means of a rule 33 which is slidable in a guide 34 secured upon the protractor or upon a member 10 which supports the same. The guideway 34 extends at an angle which is substantially at right angles to the base line 12 of the protractor. The rule 33 at its lower end is pivotally connected to the slide 31. Preferably this pivot 35 is halfway between the two trammel points 3 and 30. By this means, if it be assumed that the trammel point 30 first contacts with the blade B as the pitchometer is moved downward to contact with the blade instead of pivoting about 21, the arm 2 will fulcrum on the trammel point 30 and further downward pressure will cause the slide 31 to move outward along the arm 2, and by reason of the rule 33 being held in the vertical guide 34, the angular position of the arm 2 relative to the base line of the protractor will change until the trammel point 3 has also contacted with the blade B and until both trammel points bear with equal pressure upon the blade.

The rule 33 may also be employed for another purpose, that is, to determine directly the nominal pitch of the propeller blade, or the ratio of the advance of the blade at any given circumference to the diameter at that circumference. This may be done conveniently by calibrating the rule 33 in proper units, these calibrations cooperating with an index 36, the figures on the rule being visible through an aperture 37 in the guide 34.

Suitable means are provided for supporting the pitchometer elements so far described in a definite relation to the axis of the propeller. Primarily, of course, if the propeller is not mounted upon a shaft it will be necessary to attach the device to the propeller. This may be done in a variety of ways, the exact means being relatively unimportant. I have shown a base 4 having an upwardly directed cone 40 and having a bolt 41 extending upwardly therefrom. A cone 42, directed downwardly and secured upon the bolt 41, by cooperation with the cone 40 and by centering each in its end of the propeller bore, will center the bolt along the axis of the propeller. Upon this bolt, then, any suitable standard may be supported.

It is necessary to provide a standard which may be employed either upon loose propellers or upon those which remain attached to their shaft. For loose propellers it is only necessary to provide a bar 5 which is perforated as at 54 to receive the bolt 41. The device is shown so supported in Figure 1 and a nut 44 is shown as screwed down upon the bolt 41 to secure the bar 5 of the standard in place thereon. For attachment to propellers which are not removed from the shaft I provide a clamping bar 51, bolts 52 and nuts 53, all of which cooperate with the bar 5 to clamp upon the shaft of a propeller to be measured. To this end I have also shown the bar 5 as notched at 55 to center it upon the shaft S. The device is shown so mounted in Figure 2. The center of the notch 55 and of the hole 54 lie in the same radial plane which includes the pivot 35, thus insuring always that both trammel points will lie in a plane which is perpendicular to such a radial plane, and will be equidistant from such radial plane. Any variation from such position will affect the accuracy of the device.

To the bar 5 is secured a slide bar 6 or other means whereby the protractor and associated parts may be supported from the standard in such way that it has movement relative thereto both towards and from the standard and above and below the level of same. The slide bar 6 may be pivoted to the end of the bar 5 as indicated at 65, and a slide 61 which is slidable lengthwise of the bar 6 pivotally supports the protractor 1, or the member 10 which is secured thereto. The pivot of the protractor is indicated at 62. By sliding the slide 61 in or out along the slide bar 6 the trammel points 3 and 30 may be brought towards the axis of the propeller or moved away therefrom. By such movement, and by permitting the bar 6 and the protractor to pivot each upon its respective support, the device is made capable of use upon propellers of widely varying pitch and size. It is also possible with the same mounting to reverse the protractor and read the under side of the blade. As the standard 5 may pivot about the bolt 41 which supports it, it is possible by tilting the protractor to read the several blades of the propeller at the same radius in succession, and thus to compare the pitches of the several blades.

In such readings it is essential that the trammel points be positioned at a definitely determinable distance from the propeller axis. Ordinarily this can be done very accurately by eye, alining the protractor with the propeller axis, but in order to insure absolute accuracy I may provide a sliding bar 7 slidable in a guide 75 upon the standard 5, and carrying upon its end an angularly disposed tip 71. The outer surface 72 of this tip, that is, the surface which is towards the protractor, is preferably plane and parallel to the propeller axis, The rear surface 11 of the member 10 which carries the protractor is also made plane where it is contacted by the face 72. Hence by contact of the two plane surfaces 72 and 11, the protractor is made to pivot about its pivot 62 and thus to definitely position the trammel points 3 and 30 with respect to the propeller axis. By graduating the bar 7 in proper units of length the exact distance of the trammel points from the propeller axis may be exactly determined. It will be noted that the end 73 of the bar 7 which carries the tip 71 is rounded, thus permitting the swinging of the tip 71 into any angular position about this end. This is of a special advantage to accommodate large sizes of propellers and to permit reversal of the position of the protractor.

In order to permit the protractor and trammel points to be exactly positioned when the device is clamped upon a propeller shaft S, and to exactly measure the distance of the points from the axis, I provide the attachment which consists of cross guides 8 with the bar 7 slidable in one guide and a bar 81 slidable transversely thereof in the other guide towards and from the shaft S.

Upon the end of the bar 81 I provide a notch 82 which by contact with the shaft S will accurately position the cross guides 8 relative to the axis of the shaft. The device is so arranged that instead of reading on the scale 7 from the edge 77 of the guide 75, as is done when mounted as in Figure 1, the reading will be taken from the edge 87 of the cross guides 8, which is the same relative distance from a plane through the axis of the propeller shaft and at right angles to the bar 7 as is the edge 77 from a similar plane through the axis of the aperture 54.

By contacting the points 3 and 30 with the blade the angle thereof between the points of contact may be read directly upon the protractor 1. The tip 71 insures positioning the protractor in a plane parallel to the propeller axis, and the rule 7 measures directly the radial distance of the trammel points. With this data the pitch is readily determined, in a well-known manner, or ascertained quickly from tables prepared for the purpose.

What I claim as my invention is:

1. A propeller pitchometer comprising a base provided with means for fixing it upon and in definite relation to the propeller to be measured, two angle-indicating members having complemental indicating means, means for supporting one of said indicating members from the base to hold it in a plane which is parallel with the axis of the propeller and radially removed therefrom and for adjustment both radially of the propeller and parallel with the propeller axis, the other indicating member being pivoted upon the first and carrying blade-contacting points separated along chords of the propeller blades subtended thereby.

2. A propeller pitchometer comprising a base provided with means for fixing it upon and in definite relation to the propeller to be measured, two angle-indicating members having complemental indicating means, means for supporting one of said indicating members from the base to hold it in a plane parallel with the axis of the propeller and radially removed therefrom and to be adjustable both radially on and parallel with the propeller axis, a slide carried by the other indicating member and having two blade-contacting points separated lengthwise thereof.

3. A propeller pitchometer comprising a base adapted to be secured in fixed relation to the propeller axis, two angle-measuring members pivoted together and carrying one a reading index and the other a cooperating scale, means for supporting one of said angle-measuring members from the base for adjustment both lengthwise of and perpendicular to the propeller axis, the other measuring member carrying two blade-contacting points spaced apart lengthwise of the chord of the propeller angle intercepted thereby.

4. A propeller pitchometer comprising a base adapted to be secured to a propeller, two angle-indicating members pivoted together, an arm pivoted upon the base to swing parallel with an axial plane of the propeller and at its other end carrying one of the angle-indicating members upon a pivot axis which is parallel with its own pivot axis, the other angle-indicating member being pivoted to the first upon an axis which is approximately radial to the propeller axis and carrying two blade-contacting fingers separated lengthwise of and lying in the chord of the propeller angle subtended thereby.

5. A propeller pitchometer comprising a base having means for securing it to the propeller in definite relations with the propeller axis, an arm pivoted to the base to swing in a plane which is parallel with an axial plane of the propeller, a block mounted to slide upon said arm, an angle indicating device comprising a base block and an arm pivoted thereon, said base block being pivoted upon the slide block upon an axis perpendicular to the plane of swing of the first mentioned arm, the arm of the angle indicating device being pivoted to its base block to swing in a plane which substantially includes the pivot axis of said base block, said base block and its arm having one a protractor scale concentric with their pivot connection and the other a scale reading finger.

6. A propeller pitchometer comprising a base adapted to be secured to a propeller, two angle indicating members pivoted together, an arm pivoted by one end to the said base and by its other end to one of said angle-indicating members, said pivot axes being parallel and permitting said arm to swing in a plane parallel with an axial plane of the propeller, the other of said angle-indicating members carrying two blade-contacting points, and a bar mounted to slide upon the base and having a right-angle foot adapted to position the angle-indicating members in a plane parallel with the propeller axis.

7. A pitchometer for propellers comprising a base adapted to be secured in definite angular relation with the propeller axis, an arm pivoted upon the base to swing in a plane which is parallel to the propeller axis, a slide mounted upon said arm, a sub-base pivoted upon said slide upon an axis parallel with that upon which the arm swings, a protractor secured to said sub-base, an index arm pivoted upon the protractor and having an extension carrying points adapted to contact with the face of the propeller blade, a scale bar slidably mounted upon the base in a plane perpendicular to the propeller axis, and an arm carried by the outer end of the scale bar and swingable in a plane perpendicular thereto and adapted to engage the sub-base to position the index arm and protractor in a plane which is parallel with the axis of the propeller.

8. In a propeller pitchometer, a standard adapted to be fixed for movement only in a plane normal to a propeller axis, a protractor plate, an index arm pivoted thereon, and adapted by contact with a propeller blade to be positioned angularly relative to the protractor base line, means supporting said protractor from said standard to permit swinging of the protractor about an axis which is substantially normal to a plane through the propeller axis and passing through the protractor, and means for fixing the angle of the protractor plate relative to the propeller axis.

Signed at Seattle, King County, Washington, this 12th day of October 1923.

BERT O. GODFREY.